US012081471B2

(12) United States Patent
Gao et al.

(10) Patent No.: US 12,081,471 B2
(45) Date of Patent: Sep. 3, 2024

(54) UPLINK TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 17/262,858

(22) PCT Filed: Jul. 27, 2018

(86) PCT No.: PCT/CN2018/097538
§ 371 (c)(1),
(2) Date: Jan. 25, 2021

(87) PCT Pub. No.: WO2020/019317
PCT Pub. Date: Jan. 30, 2020

(65) Prior Publication Data
US 2021/0306123 A1    Sep. 30, 2021

(51) Int. Cl.
*H04L 5/00*  (2006.01)
*H04B 7/0408*  (2017.01)
*H04L 27/26*  (2006.01)

(52) U.S. Cl.
CPC ......... *H04L 5/0048* (2013.01); *H04B 7/0408* (2013.01); *H04L 27/2605* (2013.01); *H04L 27/2613* (2013.01)

(58) Field of Classification Search
CPC ............... H04L 5/0048; H04L 27/2605; H04L 27/2613; H04B 7/0408
See application file for complete search history.

(56) References Cited

U.S. PATENT DOCUMENTS

| 10,819,408 | B2 * | 10/2020 | Park | H04B 7/065 |
| 2018/0205440 | A1 * | 7/2018 | Enescu | H04B 7/0626 |

(Continued)

FOREIGN PATENT DOCUMENTS

| CN | 108289005 A | 7/2018 |
| WO | 2018/028657 A1 | 2/2018 |

(Continued)

OTHER PUBLICATIONS

Extended European Search Report issued Jul. 16, 2021 in European Application No. 18927856.7.

(Continued)

*Primary Examiner* — Parth Patel
(74) *Attorney, Agent, or Firm* — Sughrue Mion, PLLC

(57) ABSTRACT

Embodiments of the present disclosure relate to methods, devices and computer readable mediums for uplink transmission. In example embodiments, a method implemented at a terminal device is provided. The method comprises, in response to being configured with at least one SRS resource set by a network device and the at least one SRS resource set being associated with first and second CSI-RS resources, receiving, from the network device, a first CSI-RS transmitted via a first TRP over the first CSI-RS resource and a second CSI-RS transmitted via a second TRP over the second CSI-RS resource. The method further comprises determining, based on the received first and second CSI-RSs, first precoding information for uplink transmission via the first TRP and second precoding information for uplink transmission via the second TRP respectively. The method further comprises determining, from the first and second TRPs, at least one TRP for uplink transmission, the at least one TRP being associated with third precoding information selected from the first and second precoding information. In addition, the method further comprises transmitting, based (Continued)

on the third precoding information, at least one SRS to the network device via the at least one TRP.

12 Claims, 6 Drawing Sheets

(56) References Cited

U.S. PATENT DOCUMENTS

| | | | |
|---|---|---|---|
| 2019/0190569 A1* | 6/2019 | Nayeb Nazar | H04B 7/0639 |
| 2020/0014507 A1* | 1/2020 | Joseph | H04W 72/23 |
| 2020/0358493 A1* | 11/2020 | Hao | H04B 7/0404 |
| 2020/0382252 A1* | 12/2020 | Sun | H04L 27/2613 |
| 2021/0242999 A1* | 8/2021 | Baskaran | H04L 27/261 |
| 2021/0336685 A1* | 10/2021 | Cirik | H04B 7/0695 |

FOREIGN PATENT DOCUMENTS

| | | |
|---|---|---|
| WO | 2018/128504 A1 | 7/2018 |
| WO | 2018/131945 A1 | 7/2018 |

OTHER PUBLICATIONS

Zte et al., "Details of UL beam management", 3GPP TSG RAN WG1 Meeting 91, R1-1721373, Reno, USA, Nov. 27-Dec. 1, 2017 (6 pages total).

Qualcomm Incorporated, "Remaining Issues on Non-Codebook Based UL Transmission", 3GPP TSG RAN WG1 Meeting #91, R1-1720658, Nov. 27-Dec. 1, 2017, Reno, Nevada, USA (4 pages total).

Huawei et al., "UL multi-TRP/panel/beam operation in R15", 3GPP TSG RAN Meeting #91, R1-1719818, Reno, USA, Nov. 27-Dec. 1, 2017 (4 pages total).

Ericsson, "Non-codebook based UL MIMO remaining details", R1-1720739, 3GPP TSG-RAN WG1 #91, Nov. 27-Dec. 1, 2017, pp. 1-6, Reno, USA.

Huawei et al., "Discussion on UL multi-panel/TRP operation", R1-1715719, 3GPP TSG RAN WG1 Meeting NR Ad Hoc #3, Sep. 18-21, 2017, pp. 1-6, Nagoya, Japan.

International Search Report of PCT/CN2018/097538 dated Apr. 28, 2019 [PCT/ISA/210].

Written Opinion of PCT/CN2018/097538 dated Apr. 28, 2019 [PCT/ISA/237].

Office Action issued Jun. 28, 2022 in Japanese Application No. 2021-504273.

Intel Corporation, "Discussion on multi-panel and multi-TRP operation", 3GPP TSG RAN WG1 Meeting NR#3, R1-1716289, Nagoya, Japan, Sep. 18-21, 2017 (8 pages total).

3rd Generation Partnership Project; Technical Specification Group Radio Access Network; NR; Physical layer procedures for data (Release 15); 3GPP TS 38.214 V15.2.0, Jun. 2018 (5 pages total).

* cited by examiner

UPLINK TRANSMISSION

CROSS REFERENCE TO RELATED APPLICATIONS

This application is National Stage of International Application No. PCT/CN2018/097538, filed Jul. 27, 2018.

TECHNICAL FIELD

Embodiments of the present disclosure generally relate to the field of telecommunication, and in particular, to methods, devices and computer readable mediums for uplink transmission.

BACKGROUND

In new radio access (NR), two transmission schemes can be supported for uplink (UL) transmission: codebook based UL transmission and non-codebook based UL transmission. A terminal device can be configured with either of the two schemes via higher layer signaling (such as, Radio Resource Control (RRC) signaling). For codebook based transmission, the terminal device may determine its pre-coder for UL transmission based on Downlink Control Information (DCI) received from a network device. For example, some field in the DCI may indicate to the terminal device the preferred pre-coder to be used for transmission of pre-coded Sounding Reference Signal (SRS). For non-codebook based UL transmission, the terminal device may determine the pre-coder to be used for transmission for UL transmission based on measurement of an associated reference signal (RS). Once determining the pre-coder to be used for transmission for UL transmission, the terminal device may transmit pre-coded SRS to the network device over a SRS resource set configured for SRS transmission. The SRS can be received and used by the network device to perform uplink channel estimation, so as to perform resource allocation and configure transmission parameters for UL transmission (for example, Physical Uplink Shared Channel (PUSCH) transmission) based on the result of the uplink channel estimation. For example, the network device may determine at least one SRS resource from the SRS resource set to be used for PUSCH transmission. The at least one SRS resource may be indicated to the terminal device, such that UL data will be transmitted from the terminal device to the network device over the at least one SRS resource.

In NR, a network device (such as, a next generation NodeB (gNB)) may be equipped with multiple Transmission and Reception Points (TRPs) or antenna panels. That is, UL data can be transmitted from the terminal device to the network device via only one TRP or a plurality of TRPs. Each of the TRPs may provide one or more beams for communication with the terminal device. However, in current 3GPP specifications, the beam for UL transmission can only be configured via higher layer signaling (such as, RRC signaling). That is, dynamic switching among different TRPs (or different beams) cannot be supported for UL transmission.

SUMMARY

In general, example embodiments of the present disclosure provide methods, devices and computer readable mediums for UL transmission.

In a first aspect, there is provided a method implemented at a terminal device. The method comprises, in response to being configured with at least one SRS resource set by a network device and the at least one SRS resource set being associated with first and second Channel State Information-Reference Signal (CSI-RS) resources, receiving, from the network device, a first CSI-RS transmitted via a first TRP over the first CSI-RS resource and a second CSI-RS transmitted via a second TRP over the second CSI-RS resource. The method further comprises determining, based on the received first and second CSI-RSs, first precoding information for uplink transmission via the first TRP and second precoding information for uplink transmission via the second TRP respectively. The method further comprises determining, from the first and second TRPs, at least one TRP for uplink transmission, the at least one TRP being associated with third precoding information selected from the first and second precoding information. In addition, the method further comprises transmitting, based on the third precoding information, at least one SRS to the network device via the at least one TRP.

In a second aspect, there is provided a method implemented at a network device. The method comprises, in response to at least one SRS resource set associated with first and second CSI-RS resources being configured to a terminal device, transmitting, to the terminal device, a first CSI-RS via a first TRP over the first CSI-RS resource and a second CSI-RS via a second TRP over the second CSI-RS resource. The method further comprises receiving at least one SRS from the terminal device via at least one TRP, the at least one TRP being selected from the first and second TRPs by the terminal device.

In a third aspect, there is provided a device. The device comprises a processor and a memory coupled to the processor. The memory stores instructions that when executed by the processor, cause the device to perform actions. The actions include: in response to being configured with at least one SRS resource set by a network device and the at least one SRS resource set being associated with first and second CSI-RS resources, receiving, from the network device, a first CSI-RS transmitted via a first TRP over the first CSI-RS resource and a second CSI-RS transmitted via a second TRP over the second CSI-RS resource; determining, based on the received first and second CSI-RSs, first precoding information for uplink transmission via the first TRP and second precoding information for uplink transmission via the second TRP respectively; determining, from the first and second TRPs, at least one TRP for uplink transmission, the at least one TRP being associated with third precoding information selected from the first and second precoding information; and transmitting, based on the third precoding information, at least one SRS to the network device via the at least one TRP.

In a fourth aspect, there is provided a device. The device comprises a processor and a memory coupled to the processor. The memory stores instructions that when executed by the processor, cause the device to perform actions. The actions include: in response to at least one SRS resource set associated with first and second CSI-RS resources being configured to a terminal device, transmitting, to the terminal device, a first CSI-RS via a first TRP over the first CSI-RS resource and a second CSI-RS via a second TRP over the second CSI-RS resource; and receiving at least one SRS from the terminal device via at least one TRP, the at least one TRP being selected from the first and second TRPs by the terminal device.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
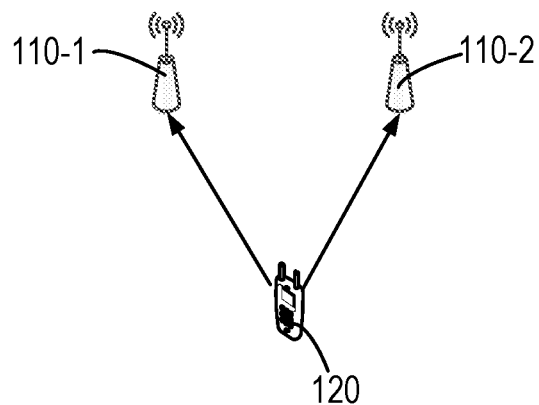
FIGS. 1A-IC show different scenarios for multi-TRP UL transmission

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As described above, two transmission schemes can be supported for uplink (UL) transmission: codebook based UL transmission and non-codebook based UL transmission. A terminal device can be configured with either of the two schemes via higher layer signaling. For codebook based transmission, the terminal device may determine precoding information for UL transmission based on DCI received from a network device. For example, some field in the DCI may indicate to the terminal device the precoding information to be used for PUSCH transmission. In addition, some field in the DCI (for example, SRS resource indicator (SRI)) may indicate to the terminal device one or more SRS resource to be used for PUSCH transmission. For non-codebook based UL transmission, the terminal device may determine the pre-coder to be used for transmission for UL transmission based on measurement of an associated RS. Once determining the pre-coder to be used for transmission for UL transmission, the terminal device may transmit pre-coded SRS to the network device over a SRS resource set configured for SRS transmission. The SRS can be received and used by the network device to perform uplink channel estimation, so as to perform resource allocation and configure transmission parameters for UL transmission (for example, PUSCH transmission) based on the result of the uplink channel estimation. For example, the network device may determine at least one SRS resource from the SRS resource set to be used for PUSCH transmission. The at least one SRS resource may be indicated to the terminal device, such that UL data will be transmitted from the terminal device to the network device based on the indicated at least one SRS resource.

In NR, a network device (such as, a gNB) may be equipped with multiple TRPs/panels. That is, UL data can be transmitted from the terminal device to the network device via only one TRP/panel or a plurality of TRPs/panels.

Figure 1B:
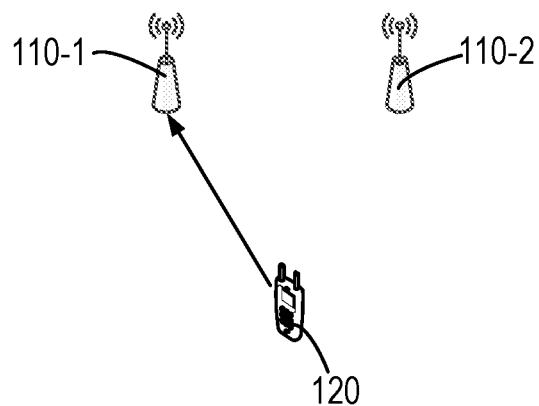
Figure 1C:
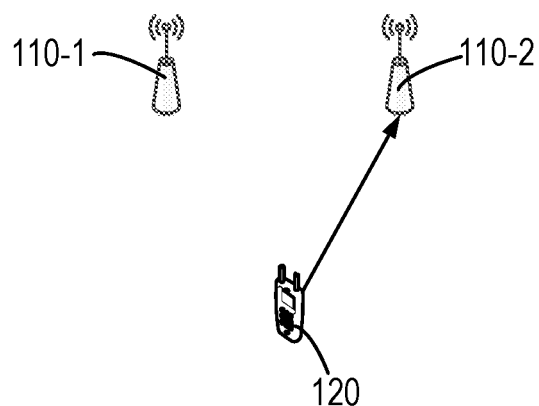

FIGS. 1A-1C show different scenarios for multi-TRP/panel UL transmission. In the examples as shown in FIGS. 1A-1C, a network device (such as, a gNB) may be equipped with a first TRP/panel 110-1 and a second TRP/panel 110-2 (collectively referred to as TRPs/panels 110 or individually referred to as TRP/panel 110) for serving a terminal device 120. For example, in the scenario as shown in FIG. 1A, the terminal device 120 may be configured to transmit UL data to the network device via both the first TRP/panel 110-1 and the second TRP/panel 110-2. In the scenario as shown in FIG. 1B, the terminal device 120 may be configured to transmit UL data to the network device via only the first TRP/panel 110-1. In the scenario as shown in FIG. 1C, the terminal device 120 may be configured to transmit UL data to the network device via only the second TRP/panel 110-2.

In the examples as shown in FIGS. 1A-1C, each of the TRPs 110 may provide one or more beams for communication with the terminal device 230. However, in current 3GPP specifications, the beam for UL transmission can only be configured via higher layer signaling. That is, dynamic switching among the above three scenarios shown in FIGS. 1A-1C cannot be supported.

Embodiments of the present disclosure provide a solution for UL transmission, in order to solve the problems above and one or more of other potential problems. With the solution, dynamic switching among different TRPs (or different beams) cannot be supported for UL transmission. For example, dynamic switching among the above three scenarios shown in FIGS. 1A-1C can be supported.

Principle and implementations of the present disclosure will be described in detail below with reference to FIGS. 2-8.

Figure 2:
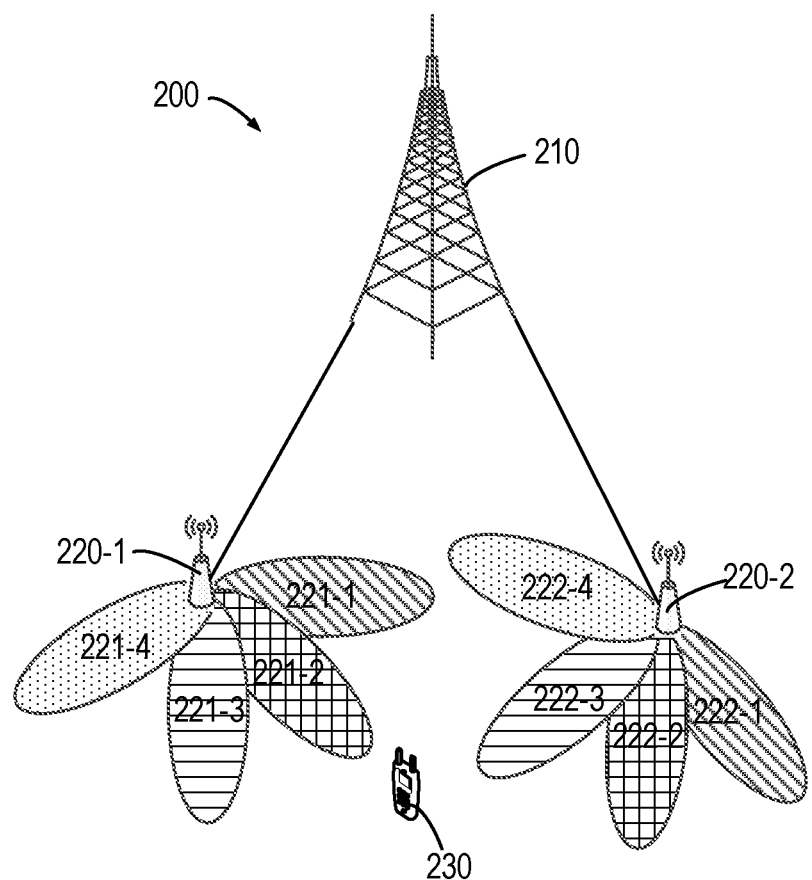
FIG. 2 is a block diagram of a communication environment in which embodiments of the present disclosure can be implemented.

FIG. 2 illustrates an example communication network 200 in which embodiments of the present disclosure can be implemented. As shown in FIG. 2, the network 200 includes a network device 210, which is coupled with two TRPs/panels 220-1 and 220-2 (collectively referred to as TRPs 220 or individually referred to as TRP 220). The network 200 also includes a terminal device 230 served by the network device 210. It is to be understood that the number of network devices, terminal devices and TRPs as shown in FIG. 2 is only for the purpose of illustration without suggesting any limitations. The network 200 may include any suitable number of devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 230.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like.

As used herein, the term "TRP" refers to an antenna array (with one or more antenna elements) available to the network device located at a specific geographical location. For example, a network device may be coupled with multiple TRPs in different geographical locations to achieve better coverage. It is to be understood that the TRP can also be panel, and the panel can also refer to an antenna array (with one or more antenna elements). Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As shown in FIG. 2, the network device 210 may communicate with the terminal device 230 via the TRPs 220-1 and 220-2. In the following text, the TRP 220-1 may be also referred to as the first TRP, while the TRP 220-2 may be also referred to as the second TRP. Each of the TRPs 220 may provide a plurality of beams for communication with the terminal device 230. For example, the TRP 220-1 may include four beams 221-1, 221-2, 221-3, and 221-4 (collectively referred to as "beams 221" or individually referred to as "beam 221"), while the TRP 220-2 may also include four beams 222-1, 222-2, 222-3 and 222-4 (collectively referred to as beams 222 or individually referred to as beam 222). It is to be understood that the number of beams as shown in FIG. 2 is only for the purpose of illustration without suggesting any limitations. The TRP 220 may provide any suitable number of beams adapted for implementing embodiments of the present disclosure.

The communications in the network 200 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. For example, all of the communications between the network device 210 and the terminal device 230 in the network 200 can be conducted via at least one of the TRPs 220.

In addition to normal data communications, the network device 210 may send a RS to the terminal device 230 in a downlink. Similarly, the terminal device 230 may transmit a RS to the network device 210 in an uplink. Generally speaking, a RS is a signal sequence (also referred to as "RS sequence") that is known by both the network device 210 and the terminal devices 230. For example, a RS sequence may be generated and transmitted by the network device 210 based on a certain rule and the terminal device 230 may deduce the RS sequence based on the same rule. Examples of the RS may include but are not limited to downlink or uplink Demodulation Reference Signal (DMRS), CSI-RS, SRS, Phase Tracking Reference Signal (PTRS), Tracking Reference Signal (TRS), fine time-frequency Tracking Reference Signal (TRS), CSI-RS for tracking, Synchronization Signal (SS)/Physical Broadcast Channel (PBCH) block, SS block (SSB) and so on.

For example, an SRS can be used by the network device 210 to perform uplink channel estimation, so as to perform resource allocation and configure transmission parameters for UL transmission (PUSCH transmission) from the terminal device 230 based on the result of the uplink channel estimation. An SRS can also be divided into different types according to its behavior in time domain, such as periodic SRS (P-SRS), aperiodic SRS (AP-SRS) and semi-persistent SRS (SP-SRS). As used herein, "P-SRS" refers to the SRS which is transmitted periodically in time domain. "SP-SRS" is similar to P-SRS except that the transmission of SP-SRS can be activated by a signal and deactivated by another signal. "AP-SRS" refers to the SRS whose transmission can be triggered by the network device via trigger signaling.

In NR, two transmission schemes can be supported for UL transmission: codebook based transmission and non-codebook based transmission. The terminal device 230 can be configured with either of the two schemes with a higher layer parameter. For codebook based transmission, the terminal device 230 can determine precoding information for UL transmission based on DCI received from the network device 210. For example, some field in the DCI may indicate to the terminal device 230 the precoding information to be used for PUSCH transmission. In addition, some field in the DCI (for example, SRS resource indicator (SRI)) may indicate to the terminal device 230 one or more SRS resources to be used for PUSCH transmission. For non-codebook based UL transmission, the terminal device 230 may measure some reference signal associated with the SRS to determine the pre-coder to be used for UL transmission. For the purpose of discussion without suggesting any limitations, in the following description, some embodiments will be described with reference to non-codebook based UL transmission.

For non-codebook based UL transmission, the terminal device 230 may be configured with a SRS configuration prior to SRS transmission. The SRS configuration may indicate at least one SRS resource set including one or more SRS resources for SRS transmission. For example, only one SRS port may be configured for each SRS resource. The terminal device 230 can measure the RS associated with the SRS to determine the pre-coder to be used for transmission of pre-coded SRS. The RS associated with the SRS can be a CSI-RS, another SRS or Synchronization Signal Block (SSB)/Physical Broadcast Channel (PBCH). For the purpose of discussion without suggesting any limitations, in the following description, some embodiments will be described with reference to CSI-RS associated with the SRS.

Once determining the pre-coder to be used for UL transmission, the terminal device 230 may transmit pre-coded SRS to the network device 210 over the SRS resource set configured for SRS transmission. The SRS can be received and used by the network device to perform uplink channel estimation, so as to perform resource allocation and configure transmission parameters for UL transmission (for example, PUSCH transmission) based on the result of the uplink channel estimation. For example, the network device 210 may determine at least one SRS resource from the SRS resource set to be used for PUSCH transmission. The at least one SRS resource may be indicated to the terminal device 230, such that UL data will be transmitted from the terminal device 230 to the network device 210 based on the at least one SRS resource.

Figure 3:
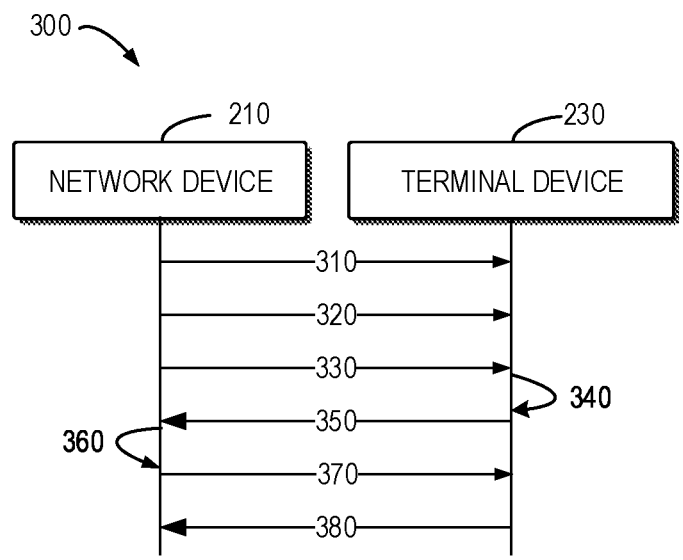
FIG. 3 shows a process for multi-TRP UL transmission according to some implementations of the present disclosure.

FIG. 3 shows a process 300 for multi-TRP UL transmission according to some embodiments of the present disclosure. For the purpose of discussion, the process 300 will be described with reference to FIG. 2. The process 300 may involve the network device 210, the TRPs 220 and the terminal device 230 as shown in FIG. 2. It is to be understood that the process 300 may include additional acts not shown and/or may omit some acts as shown, and the scope of the present disclosure is not limited in this regard.

In some embodiments, as shown in FIG. 3, the network device 210 may configure (310) to the terminal device 230 at least one SRS resource set for SRS transmission. The at least one SRS resource set may include one or more SRS resources for SRS transmission. In some embodiments, for example, only one SRS resource set may be configured for non-codebook based UL transmission. The maximum number of SRS resources included in the SRS resource set configured for non-codebook based UL transmission may be K. For example, K may be one of {4, 6, 8}. In some embodiments, the SRS resource set may be associated with two CSI-RS resources, which may be referred to as "a first CSI-RS resource" and "a second CSI-RS resource".

In some embodiments, for example, two SRS resource sets can be configured for non-codebook based UL transmission. The maximum number of SRS resources included in each of the two SRS resource set configured for non-codebook based UL transmission may be K. For example, K may be one of {4, 6, 8}. In some embodiments, the two SRS resource sets (which may be referred to as "a first SRS resource set" and "a second SRS resource set") may be associated with two CSI-RS resources respectively, which may be referred to as "a first CSI-RS resource" and "a second CSI-RS resource". For example, the first SRS resource set may be associated with the first CSI-RS resource, and the second SRS resource set may be associated with the second CSI-RS resource.

In some embodiments, a quasi-co-location (QCL) type may be configured for Physical Downlink Shared Channel (PDSCH) and/or the RS associated with the SRS via higher layer signaling. For example, the QCL type may be at least one of the following: 'QCL-TypeA': {Doppler shift, Doppler spread, average delay, average spread}; 'QCL-TypeB': {Doppler shift, Doppler spread}; 'QCL-TypeC': {Doppler shift, average delay}; 'QCL-TypeD': {Spatial Rx parameter}.

In some embodiments, if the SRS to be transmitted from the terminal device 230 to the network device 210 is an AP-SRS, the network device 210 may transmit (320) DCI to trigger SRS transmission over the configured at least one SRS resource set. The DCI including the trigger for SRS transmission may be transmitted from the network device 210 to the terminal device 230 via one of the TRPs 220 (such as, the TRP 220-1). Then, the network device 210 may transmit (330) the first and second CSI-RSs in the same slot as the DCI. In some embodiments, the network device 210 may transmit, to the terminal device 230, the first CSI-RS over the first CSI-RS resource via the first TRP 220-1 and the second CSI-RS over the second CSI-RS resource via the second TRP 220-2. In some embodiments, the QCL type for the first CSI-RS resource and that for the second CSI-RS resource may be different. In some embodiments, the first and second CSI-RSs may be transmitted in the same slot. Alternatively, in some embodiments, the first and second CSI-RSs may be transmitted in two consecutive slots respectively, or in two slots with an interval not exceeding T slots.

In response to receiving the first and second CSI-RSs from the network device 210, the terminal device 230 may determine (340) information on a pre-coder to be used for SRS transmission (also referred to as precoding information) based on measurement of the first and second CSI-RSs. For example, the terminal device 230 may determine first pre-coding information for UL transmission (for example, the UL transmission is via the first TRP 220-1) based on measurement of the first CSI-RS and determine second precoding information for UL transmission (for example, the UL transmission is via the second TRP 220-2) based on measurement of the second CSI-RS.

In some embodiments, for example, only one SRS resource set may be configured for non-codebook based UL transmission. The one SRS resource set may be divided into a first subset of SRS resources and a second subset of SRS resources. Alternatively, in some embodiments, as described above, two SRS resource sets may be configured for non-codebook based UL transmission, which are the first SRS resource set and the second SRS resource set. Only for the purpose of description, in the following description, the first subset of SRS resources or the first SRS resource set may also be referred to as a "first group of SRS resources", while the second subset of SRS resources or the second SRS resource set may also be referred to as a "second group of SRS resources".

In some embodiments, in response to receiving the first and second CSI-RSs from the network device 210, the terminal device 230 may calculate a first pre-coder for SRS transmission based on the first group of SRS resources (for example, including M SRS resources) based on the associated first CSI-RS resource. Similarly, the terminal device 230 may calculate a second pre-coder for SRS transmission based on the second group of SRS resources (for example, including N SRS resources) based on the associated second CSI-RS resource.

In some embodiments, the terminal device 230 may further determine (340) at least one TRP from the first and second TRPs 220-1 and 220-2 for PUSCH transmission. For example, the terminal device 230 may be indicated to transmit PUSCH based on at least one of the first and second groups of SRS resources. Suppose that the configured at least one SRS resource set may include K SRS resources in total. For example, K is an integer and 1≤K≤4. As another example, K is an integer and K can be one of {1, 2, 3, 4, 5, 6, 7, 8}. The terminal device 230 may determine a pre-coder for M SRS resources based on the first CSI-RS resource and another pre-coder for N SRS resources based on the second CSI-RS resource, where M+N=K. The terminal device 230 may determine values of M and N respectively, for example, based on the measurements of the first and second CSI-RSs.

In some embodiments, if M=0 or N=0, only one of the first and second groups of SRS resources may be indicated for UL transmission. That is, only one of the TRPs 220 may be selected by the terminal device 230 for UL transmission. In some embodiments, if M=0, only the second group of SRS resources may be indicated by the network device 210 for UL transmission. In some embodiments, if N=0, only the first group of SRS resources may be indicated by the network device 210 for UL transmission. In some embodiments, if M≠0 and N≠0, both the first and second groups of SRS resources may be selected for UL transmission. That is, if M=0, only the second TRP 220-2 may be selected for UL transmission; while if N=0, only the first TRP 220-1 may be selected for UL transmission. If M≠0 and N≠0, both the first TRP 220-1 and the second TRP 220-2 may be selected for UL transmission.

In some embodiments, in response to determining at least one TRP for UL transmission, the terminal device 230 may transmit (350), based on pre-coding information determined for the at least one TRP (also referred to as third pre-coding information), at least one pre-coded SRS to the network device 210 via the at least one TRP. For example, in response to determining at least one of the first and second groups of SRS resources for UL transmission, the terminal device 230 may transmit, based on the third pre-coding information that is determined based on at least one of the first and second CSI-RS resources, at least one SRS resource to the network device 210.

In some embodiments, for example, N=0. That is, only the first group of SRS resources are selected for UL transmission. For example, only the first TRP 220-1 is selected for UL transmission. In this case, the terminal device 230 may transmit, based on the first pre-coding information determined based on the first CSI-RS resource, the SRS to the network device 210 (for example, via the first TRP 220-1) over the configured at least one SRS resource set.

In some embodiments, for example, M=0. That is, only the second group of SRS resources are selected for UL transmission. For example, only the second TRP 220-2 is selected for UL transmission. In this case, the terminal device 230 may transmit, based on the second pre-coding information determined based on the second CSI-RS resource, the SRS to the network device 210 (for example, via the second TRP 220-2) over the configured at least one SRS resource set.

In some embodiments, for example, M≠0 and N≠0. That is, both of the first and second groups of SRS resources are selected for UL transmission. For example, the first TRP 220-1 and the second TRP 220-2 are selected for UL transmission. In this case, the terminal device 230 may transmit one or more SRS resources selected from the first group of SRS resources (also referred to as first SRS resource(s)) based on the first pre-coding information calculated from the first CSI-RS resource, and/or one or more SRS resources selected from the second group of SRS resources (also referred to as second SRS resource(s)) based on the second pre-coding information calculated from the second CSI-RS resource. In some embodiments, the first SRS resources and the second SRS resources may be transmitted in a same slot/symbol. Alternatively, the first SRS and second SRS resources may be transmitted in P slots/symbols with an interval between two adjacent slots/symbols not exceeding T slots/symbols. For example, this may be applicable if multi-TRP UL transmission is supported by the terminal device. In some embodiments, the first SRS resources and the second SRS resources may be transmitted in different slots/symbols, or in P slots/symbols with an interval between two adjacent slots/symbols equaling or exceeding T slots/symbols. For example, this may be applicable if multi-TRP UL transmission is not supported by the terminal device 230. For example, if multi-TRP UL transmission is enabled for the terminal device 230, the terminal device 230 may transmit, based on the first pre-coding information, a first SRS to the network device 210 via the first TRP 220-1 and transmit, based on the second pre-coding information, a second SRS to the network device 210 via the second TRP 220-2. As another example, if multi-TRP UL transmission is not enabled for the terminal device 230, the terminal device 230 may either transmit, based on the first pre-coding information, a first SRS to the network device 210 via the first TRP 220-1 or transmit, based on the second pre-coding information, a second SRS to the network device 210 via the second TRP 220-2.

In some embodiments, for different TRPs or different CSI-RS resources, different SRS resources, different SRS configurations may be used for SRS transmission. For example, a first SRS configuration can be determined for first SRS transmission, where the first SRS transmission may be performed based on the pre-coding information calculated from the first CSI-RS resource. For example, the first SRS transmission may be performed via the first TRP 220-1. As another example, a second SRS configuration can be determined for second SRS transmission, where the second SRS transmission may be performed based on the pre-coding information calculated from the second CSI-RS resource. For example, the second SRS transmission may be performed via the second TRP 220-2.

In some embodiments, the first SRS configuration and the second SRS configuration may be different from each other. For example, the first SRS configuration and the second SRS configuration may be associated with different SRS time and/or frequency resources, different SRS sequences, different comb offset values and/or different cycle shift values for SRS sequence generation. In some embodiments, if only the first group of SRS resources are selected for UL transmission, the first SRS configuration can be used for SRS transmission. Alternatively, in some embodiments, if only the second group of SRS resources are selected for UL transmission, the second SRS configuration can be used for SRS transmission. Alternatively, in some embodiments, if both of the first and second groups of SRS resources are selected for UL transmission, the terminal device 230 may transmit a first SRS based on the first SRS configuration and transmit a second SRS based on the second SRS configuration. In this way, the network device 210 can identify the selected group of SRS resources based on the received SRS(s).

In some embodiments, if only the first TRP 220-1 is selected for UL transmission, the first SRS configuration can be used for SRS transmission via the first TRP 220-1. Alternatively, in some embodiments, if only the second TRP 220-2 is selected for UL transmission, the second SRS configuration can be used for SRS transmission via the second TRP 220-2. Alternatively, in some embodiments, if both the first and second TRPs 220-1 and 220-2 are selected for UL transmission and if multi-TRP uplink transmission is enabled for the terminal device 230, the terminal device 230 may transmit a first SRS based on the first SRS configuration via the first TRP 220-1 and transmit a second SRS based on the second SRS configuration via the second TRP 220-2. In this way, the network device 210 can identify the selected TRP(s) based on the received SRS(s).

In some embodiment, in response to the at least one SRS is received by the network device 210, the network device 210 can perform uplink channel estimation based on the received at least one SRS and determine (360) at least one SRS resource from the at least one SRS resource set to be used for PUSCH transmission based on the result of the uplink channel estimation. The network device 210 may indicate (370) the at least one SRS resource to the terminal device 230. For example, the network device 210 may transmit DCI (also referred to as "uplink grant") to the terminal device 230 and the DCI may include a SRS resource indicator (SRI) for indicating the determined at least one SRS resource.

In some embodiments, if only the first group of SRS resources are selected for UL transmission, the network device 210 may transmit the DCI including the SRI indicating at least one SRS resources in the first group of SRS resources to the terminal device 230. Alternatively, in some embodiments, if only the second group of SRS resources are selected for UL transmission, the network device 210 may transmit the DCI including the SRI indicating at least one SRS resources in the second group of SRS resources to the terminal device 230. Alternatively, in some embodiments, if both of the first and second groups of SRS resources are selected for UL transmission, the network device 210 may transmit the DCI including the SRI indicating X SRS resources in the first set/subset of SRS resources and/or Y SRS resources in the second set/subset of SRS resources to the terminal device 230, where X and Y each are a non-negative integer and X+Y≠0.

In some embodiments, if only the first TRP 220-1 is selected for UL transmission and the SRS is transmitted only via the first TRP 220-1 to the network device 210, the network device 210 may transmit the DCI including the SRI via the first TRP 220-1 to the terminal device. Alternatively, in some embodiments, if only the second TRP 220-2 is selected for UL transmission and the SRS is transmitted only via the second TRP 220-2 to the network device 210, the network device 210 may transmit the DCI including the SRI via the second TRP 220-2. Alternatively, in some embodiments, if both the first and second TRPs 220-1 and 220-2 are selected for UL transmission and the SRSs are transmitted to the network device 210 via both the first and second TRPs 220-1 and 220-2, the network device 210 may transmit the DCI including the SRI via the first TRP 220-1 or the second TRP 220-2.

In some embodiments, the network device 210 may determine the number of bits to be used for the SRI based on at least one of the following: the number of SRS resources included in the plurality of SRS resources, the number of groups of SRS resources in the plurality of SRS resources, the number of TRPs included in the at least one TRP, and whether multi-TRP uplink transmission is enabled for the terminal device. Then, the network device 210 may transmit the SRI with the determined number of bits in the uplink grant.

For example, suppose that the at least one SRS resource set includes 2 SRS resources (for example, represented as SRS resource 0 and SRS resource 1) and the maximum number of supported layers for PUSCH transmission is 2. In some embodiments, the possible values of the SRI may be shown as the following table 1:

TABLE 1

| The possible values of the SRI field | Index of SRS resource(s) |
|---|---|
| 0 | 0 (for 1-layer PUSCH transmission) |
| 1 | 1 (for 1-layer PUSCH transmission) |
| 2 | 0, 1 (for 2-layer PUSCH transmission) |
| 3 | reserved |

In some embodiments, if M=0 or N=0, all of the possible values (that is, 0, 1, 2 and 3) as shown in Table 1 are applicable to the terminal device 230. In some embodiments, if M≠0 and N≠0, and if multi-TRP UL transmission is enabled for the terminal device 230, the value '2' may be applicable to the terminal device 230. Otherwise, if M≠0 and N≠0, and if multi-TRP UL transmission is disabled for the terminal device 230, the value '2' may not be applicable to the terminal device 230.

In some embodiments, if only one group of SRS resources or only one TRP is selected for UL transmission, the network device 210 may determine the number of bits for the SRI as the following equation (1):

$$\left\lceil \log_2 \left( \sum_{k=1}^{\min\{L_{max}, N_{SRS}\}} \binom{N_{SRS}}{k} \right) \right\rceil \quad (1)$$

where $L_{max}$ represents the maximum number of supported layers for PUSCH transmission and $N_{SRS}$ represents the number of SRS resources in the at least one SRS resource set. Alternatively, if two TRPs are selected for UL transmission and if the terminal device 230 supports multi-TRP transmission simultaneously, the network device 210 may also determine the number of bits for the SRI according to the above formula (1).

However, if two groups of SRS resources or two TRPs are selected for UL transmission and if the terminal device 230 does not support multi-TRP transmission simultaneously, some possible values can be excluded from the SRI field. For example, suppose that the at least one SRS resource set includes 2 SRS resources (such as, SRS resource 0 and SRS resource 1) and the possible values of the SRI may be shown as the above table 1. In some embodiments, if two TRPs are selected for UL transmission and if the terminal device 230 does not support multi-TRP transmission simultaneously, only one transmission layer may be supported for PUSCH transmission. In this case, the values '2' and '3' as shown in the above table 1 may be excluded from the SRI field. In this way, only one bit may be enough for the SRI field.

In some embodiments, for example, one or two groups of SRS resources may be configured to the terminal device 230 for SRS transmission and the one or two groups of SRS resources may be associated with the first and second CSI-RS resources. The first CSI-RS resource may be configured for transmission of the first CSI-RS (for example, via the first TRP 220-1), and the second CSI-RS resource may be configured for transmission of the second CSI-RS (for example, via the second TRP 220-2). In some embodiments, if only one SRS resource set associated with the first and second CSI-RS resources is configured to the terminal device 230 for SRS transmission, there may be (N1+N2) SRS resources included in the SRS resource set. For example, N1 SRS resources in the SRS resource set may be configured for first SRS transmission, where the first SRS transmission may be performed based on the pre-coding information calculated from the first CSI-RS resource. For example, the first SRS transmission may be performed via the first TRP 220-1. In addition, N2 SRS resources in the SRS resource set may be configured for second SRS transmission, where the second SRS transmission may be performed based on the pre-coding information calculated from the second CSI-RS resource. For example, the second SRS transmission may be performed via the second TRP 220-2. In some embodiments, if two groups of SRS resources (for example, the first and second groups of SRS resources) are configured to the terminal device 230 for SRS transmission, one of the two groups of SRS resources may include N1 SRS resources for the first SRS transmission, where the first SRS transmission may be performed based on the pre-coding information calculated from the first CSI-RS resource. For example, the first SRS transmission may be performed via the first TRP 220-1. In addition, the other of the two groups of SRS resources may include N2 SRS resources for the second SRS transmission, where the second SRS transmission may be performed based on the pre-coding information calculated from the second CSI-RS resource. For example, the second SRS transmission may be performed via the second TRP 220-2. In some embodiments, in this case, the number of bits for the SRI field can be determined as the following equation (2):

$$\left\lceil \log_2 \left( \sum_{k=1}^{\min\{L, N1+N2\}} \binom{N1+N2}{k} \right) \right\rceil \quad (2)$$

where L represents the maximum number of supported layers for PUSCH transmission. For example, the possible values for the SRI field may include 0, 1, 2 . . . and N1+N2−1. For example, suppose that N1=4 and N2=4, the possible values for the SRI field may be shown as the following table 2:

TABLE 2

| The possible values of the SRI field | Index of SRS resource(s) |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 0, 1 |
| 9 | 0, 2 |
| 10 | 0, 3 |
| 11 | 1, 2 |
| 12 | 1, 3 |
| 13 | 2, 3 |
| 14 | 4, 5 |
| 15 | 4, 6 |
| 16 | 4, 7 |
| 17 | 5, 6 |
| 18 | 5, 7 |
| 19 | 6, 7 |
| 20 | 0, 1, 2 |
| 21 | 0, 1, 3 |
| 22 | 0, 2, 3 |
| 23 | 1, 2, 3 |
| 24 | 0, 1, 2, 3 |
| 25 | 4, 5, 6 |
| 26 | 4, 5, 7 |
| 27 | 5, 6, 7 |
| 28 | 4, 5, 6, 7 |
| 29 | reserved |
| 30 | reserved |
| 31 | reserved |

Returning to FIG. 3, in response to receiving an indication that at least one SRS resource from the at least one SRS resource set is to be used for UL transmission, the terminal device 230 may transmit (380), based on the third precoding information, data to the network device (for example, via the at least one TRP) over the at least one SRS resource.

Figure 4A:
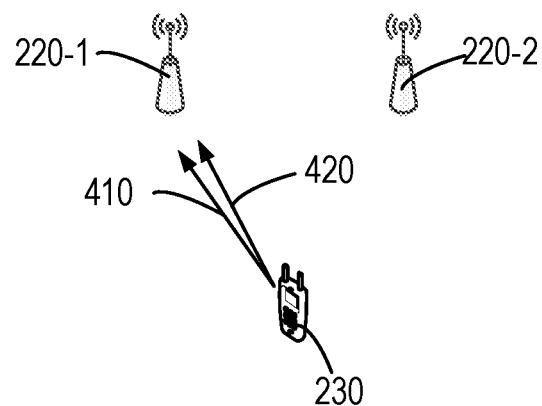
FIGS. 4A-4C show examples of some embodiments of the present disclosure.

In some embodiments, if only the first group of SRS resources or only the first TRP 220-1 is selected for UL transmission (for example, the SRS is transmitted only via the first TRP 220-1 to the network device 210), the terminal device 230 may transmit UL data (for example, via the first TRP 220-1) over the at least one SRS resource from the first group of SRS resources indicated by the SRI. FIG. 4A shows an example of such embodiments. In the example as shown in FIG. 4A, suppose that only the first TRP 220-1 is selected for UL transmission and the SRS is transmitted only via the first TRP 220-1 to the network device 210. The SRI received by the terminal device 230 indicates that a first SRS resource 410 and a second SRS resource 420 are to be used for UL transmission. In this case, as shown in FIG. 4A, if the terminal device 230 supports two transmission layers, the terminal device 230 may transmit UL data to the first TRP 220-1 over the SRS resources 410 and 420.

Figure 4B:
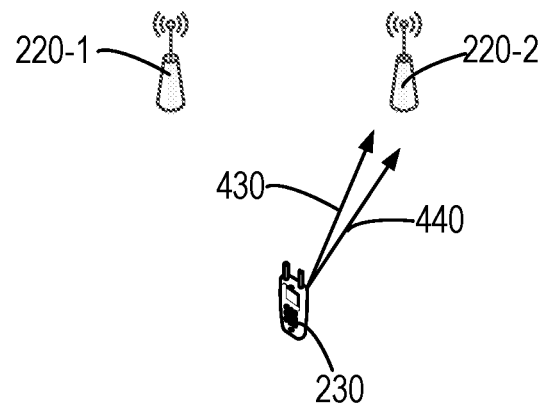

Alternatively, in some embodiments, if only the second group of SRS resources or only the second TRP 220-2 is selected for UL transmission (for example, the SRS is transmitted only via the second TRP 220-2 to the network device 210), the terminal device 230 may transmit UL data (for example, via the second TRP 220-2) over the at least one SRS resource from the second group of SRS resources indicated by the SRI. FIG. 4B shows an example of such embodiments. In the example as shown in FIG. 4B, suppose that only the second TRP 220-2 is selected for UL transmission and the SRS is transmitted only via the second TRP 220-2 to the network device 210. The SRI received by the terminal device 230 indicates that a first SRS resource 430 and a second SRS resource 440 are to be used for UL transmission. In this case, as shown in FIG. 4B, if the terminal device 230 supports two transmission layers, the terminal device 230 may transmit UL data to the second TRP 220-2 over the SRS resources 430 and 440.

Figure 4C:
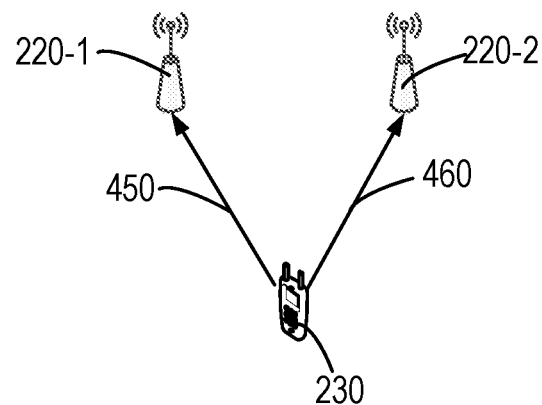

Alternatively, in some embodiments, if both of the first and second groups of SRS resources or both the first and second TRPs 220-1 and 220-2 are selected for UL transmission (for example, the SRI indicates a first SRS resource for UL transmission via the first TRP 220-1 and a second SRS resource for UL transmission via the second TRP 220-2), the terminal device 230 may transmit UL data (for example, via the first TRP and/or the second TRP 220-2) over the at least one SRS resource from at least one of the first and second groups of SRS resources indicated by the SRI. For example, the SRI indicating X SRS resources in the first group of SRS resources and/or Y SRS resources in the second group of SRS resources to the terminal device 230, where X and Y each are a non-negative integer and X+Y≠0. In some embodiments, in response to multi-TRP transmission being enabled for the terminal device 230, the terminal device 230 may transmit, based on the first precoding information, at least a first part of the data to the network device 210 via the first TRP 220-1 and transmit, based on the second precoding information, at least a second part of the data to the network device 210 via the second TRP 220-2. FIG. 4C shows an example of such embodiments. In the example as shown in FIG. 4C, suppose that both the first and second TRPs 220-1 and 220-2 are selected for UL transmission and the terminal device 230 supports multi-TRP transmissions simultaneously. The SRI received by the terminal device 230 indicates that a first SRS resource 450 is to be used for UL transmission via the first TRP 220-1 and a second SRS resource 460 is to be used for UL transmission via the second TRP 220-2. In this case, as shown in FIG. 4B, the terminal device 230 may transmit UL data to the first TRP 220-1 over the SRS resource 450 and transmit UL data to the second TRP 220-2 over the SRS resource 460.

In some embodiments, as described above, in response to receiving the associated CSI-RS (such as, the first CSI-RS and/or the second CSI-RS) from the network device 210, the terminal device 230 may determine, based on measurement of the associated CSI-RS, a respective pre-coder for SRS transmission. For example, the terminal device 230 may determine a rank (which indicates the number of transmission layers) based on measurement of the associated CSI-RS. However, the determined rank may be less than the number of SRS resources included in the SRS resource set corresponding to the CSI-RS. Suppose that the rank determined based on measurement of the associated CSI-RS is P and the number of SRS resources included in the SRS resource set is N. For example, P≤N. In some embodiments, the terminal device 230 may only determine the pre-coder for UL transmission over at most P SRS resources. In this event, the SRI which indicates more than P SRS resources for UL transmission may not be expected by the terminal device 230. That is, if the SRI which indicates more than P SRS resources for UL transmission is transmitted to the terminal device 230, the terminal device 230 may not transmit UL data based on the SRI.

In current 3GPP specifications, two PUSCH power control (such as, closed loop power control) adjustment states can be supported. Different PUSCH power control adjustment states may indicate different sets of power control parameters. For example, SRS transmission and PUSCH transmission may be configured via higher layer signaling (such as, RRC signaling) to be associated with a same power control adjustment state, such as, either of the two PUSCH power control adjustment states. Alternatively, SRS transmission may be configured via higher layer signaling (such as, RRC signaling) with a separate power control adjustment state from PUSCH transmission, for example, which is different from the two PUSCH power control adjustment states. However, in the scenario of multi-TRP transmission, power control adjustment states of SRS transmission for different TRPs may be different. In this event, configuring the power control adjustment state via RRC signaling may not adapt to dynamic switching for UL transmission among different TRPs (or different beams).

Embodiments of the present disclosure provide a solution of power control for SRS transmission, in order to solve the problems above and one or more of other potential problems. In some embodiments, for non-codebook based UL transmission, a power control adjustment state for a SRS resource, which is the same as one of the two PUSCH power control adjustment states, can be implicitly indicated by the SRI field.

In some embodiments, suppose that two PUSCH closed loop power control states A and B can be supported. Each of the two groups of SRS resources may be configured to be associated with one of the two closed loop power control states A and B. For example, the first group of SRS resources may be configured to be associated with the closed loop power states A, while the second group of SRS resources may be configured to be associated with the closed loop power states B.

In some embodiments, in response to receiving from the network device 210 the SRI indicating that the at least one SRS resource from the first and/or second group of SRS resources is to be used for UL transmission, the terminal device 230 can determine the closed loop power control state for the at least one SRS resource implicitly. For example, the SRI may indicate X SRS resources in the first group of SRS resources and/or Y SRS resources in the second group of SRS resources to the terminal device 230, where X and Y each are a non-negative integer and X+Y≠0. For example, if the indicated SRS resources are all from the first group of SRS resources, the closed loop power control state A can be determined to be used for SRS transmission. If the indicated SRS resources are all from the second group of SRS resources, the closed loop power control state B can be determined to be used for SRS transmission. If the SRI indicates X+Y SRS resources to the terminal device 230, where X SRS resources are from the first group of SRS resources and Y SRS resources are from the second group of SRS resources, the closed loop power control state A can be determined to be used for SRS transmission based on the X SRS resources, and the closed loop power control state B can be determined to be used for SRS transmission based on the Y SRS resources.

In some embodiments, suppose that two PUSCH closed loop power control states A and B can be supported. Each of the two groups of SRS resources may be configured to be associated with one of the two closed loop power control states A and B. For example, the first group of SRS resources may be configured to be associated with the closed loop power states A, while the second group of SRS resources may be configured to be associated with the closed loop power states B. In some embodiments, if the terminal device 230 calculates a first pre-coder based on the associated first CSI-RS resource for the first SRS transmission, the closed loop power control state A can be determined to be used for the first SRS transmission. In some embodiments, if the terminal device 230 calculates a second pre-coder based on the associated second CSI-RS resource for the second SRS transmission, the closed loop power control state B can be determined to be used for the second SRS transmission.

In some embodiments, in response to receiving from the network device 210 the SRI indicating that the at least one SRS resource from the first and/or second group of SRS resources is to be used for UL transmission, the terminal device 230 can determine the closed loop power control state for the at least one SRS resource implicitly. For example, the SRI may indicate X SRS resources in the first group of SRS resources and/or Y SRS resources in the second group of SRS resources to the terminal device 230, where X and Y each are a non-negative integer and X+Y≠0. For example, if the indicated SRS resources are all from the first group of SRS resources, the closed loop power control state A can be determined to be used for SRS transmission. If the indicated SRS resources are all from the second group of SRS resources, the closed loop power control state B can be determined to be used for SRS transmission. If the SRI indicates X+Y SRS resources to the terminal device 230, where X SRS resources are from the first group of SRS resources and Y SRS resources are from the second group of SRS resources, the closed loop power control state A can be determined to be used for SRS transmission based on the X SRS resources, and the closed loop power control state B can be determined to be used for SRS transmission based on the Y SRS resources In some embodiments, suppose that two PUSCH closed loop power control states A and B can be supported. Each of SRS resources in the at least one SRS resource set can be configured to be associated with one of the two closed loop power control states A and B. That is, the power control adjust state for a given SRS resource can be predetermined to be A or B. In addition, within a SRS resource set, some SRS resources may be associated with the closed loop power control state A, while others may be associated with the closed loop power control state B. In some embodiments, in response to receiving from the network device 210 the SRI indicating that an SRS resource from the at least one SRS resource set is to be used for UL transmission, the terminal device 230 can determine the closed loop power control state for the SRS resource implicitly.

The terminal device 230 may be equipped with multiple antennas for transmitting/receiving signals (for example, the SRS or any other signals) to/from the network device 210. With multiple antennas supported by the terminal device 230, SRS antenna switching can be supported. SRS antenna switching generally provides two distinct purposes: uplink transmission diversity for PUSCH, which may be either open loop or closed loop, and time division duplex (TDD) or frequency division duplex (FDD) downlink MIMO beamforming based on channel reciprocity. However, in current 3GPP specifications, SRS antenna switching cannot support downlink multi-TRP transmission.

Figure 5:
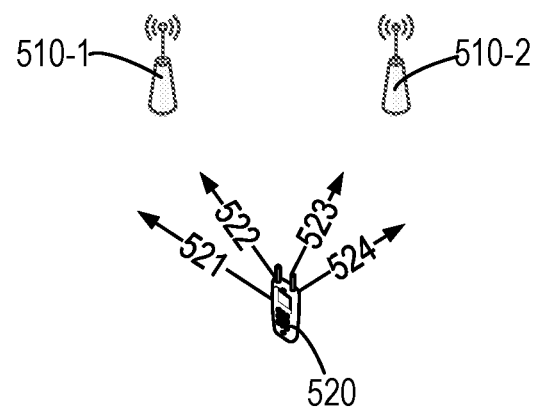
FIG. 5 shows an example of some embodiments of the present disclosure.

In some embodiments, if only one TRP is selected for DL transmission, the downlink pre-coder can be determined according to current 3GPP specification. Alternatively, in some embodiments, two TRPs may be selected for DL transmission. FIG. shows an example of such embodiments. As shown in FIG. 5, TPRs 510-1 and 510-2 may be selected by a network device (not shown in FIG. 5) for transmitting DL data to a terminal device 520. The terminal device 520 may provide 4 receiving antenna ports 521, 522, 523 and 524. In some embodiments, for the TRP 510-1, the downlink pre-coder can be determined based on signals transmitted over the antenna ports 521 and 522, while signals transmitted over the antenna ports 523 and 524 can be regarded as interference. For the TRP 510-2, the downlink pre-coder can be determined based on signals transmitted over the antenna ports 523 and 524, while signals transmitted over the antenna ports 521 and 522 can be regarded as interference.

Figure 6:
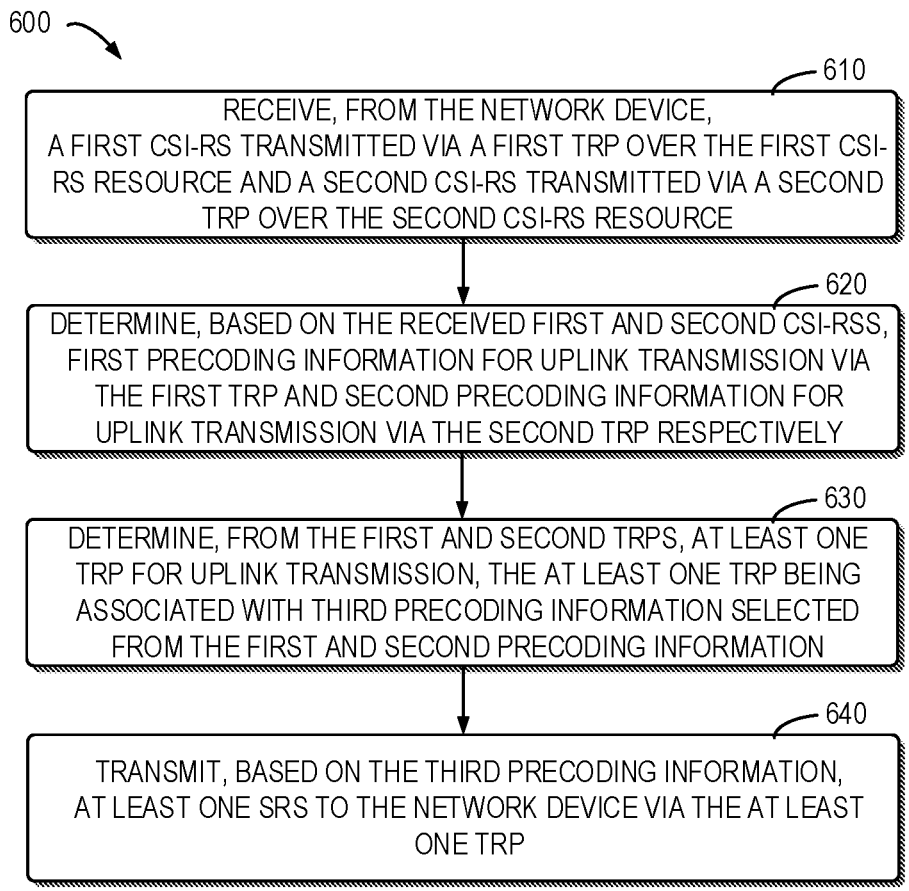
FIG. 6 shows a flowchart of an example method according to some embodiments of the present disclosure.

FIG. 6 shows a flowchart of an example method 600 in accordance with some embodiments of the present disclosure. The method 600 can be implemented at the terminal device 230 as shown in FIG. 2. It is to be understood that the method 600 may include additional blocks not shown and/or may omit some blocks as shown, and the scope of the present disclosure is not limited in this regard. For the purpose of discussion, the method 600 will be described from the perspective of the terminal device 230 with reference to FIG. 2.

At block 610, in response to being configured with at least one SRS resource set by a network device and the at least one SRS resource set being associated with first and second CSI-RS resources, the terminal device 230 receives, from the network device, a first CSI-RS transmitted via a first TRP over the first CSI-RS resource and a second CSI-RS transmitted via a second TRP over the second CSI-RS resource.

At block 620, the terminal device 230 determines, based on the received first and second CSI-RSs, first precoding information for uplink transmission via the first TRP and second precoding information for uplink transmission via the second TRP respectively.

At block 630, the terminal device 230 determines, from the first and second TRPs, at least one TRP for uplink transmission, the at least one TRP being associated with third precoding information selected from the first and second precoding information.

At block 640, the terminal device 230 transmits, based on the third precoding information, at least one SRS to the network device via the at least one TRP.

In some embodiments, the at least one SRS resource set includes a plurality of SRS resources and the at least one TRP is the first TRP. The terminal device 230 may transmit the at least one SRS by: transmitting, based on the first precoding information, the at least one SRS to the network device via the first TRP over the plurality of SRS resources.

In some embodiments, the at least one SRS resource set includes a plurality of SRS resources and the at least one TRP includes the first and second TRPs. The terminal device 230 may transmit the at least one SRS by: determining a first part of the plurality of SRS resources to be used for SRS transmission via the first TRP and a second part of the plurality of SRS resources to be used for SRS transmission via the second TRP; and in response to multi-TRP uplink transmission being enabled for the terminal device, transmitting, based on the first precoding information, a first SRS to the network device via the first TRP over the first part of the plurality of SRS resources, and transmitting, based on the second precoding information, a second SRS to the network device via the second TRP over the second part of the plurality of SRS resources.

In some embodiments, the terminal device 230 may transmit the first SRS by: determining a first SRS configuration for transmission of the first SRS; and transmitting the first SRS based on the first SRS configuration. The terminal device 230 may transmit the second SRS by: determining a second SRS configuration for transmission of the second SRS; and transmitting the second SRS based on the second SRS configuration.

In some embodiments, the first SRS configuration is different from the second SRS configuration.

In some embodiments, the first and second SRS configurations are associated with at least one of the following: different SRS resources; different SRS sequences; and different cycle shift values for SRS sequence generation.

In some embodiments, the at least one SRS resource set includes a plurality of SRS resources. The method 600 further comprises: in response to receiving an indication that at least one SRS resource from the plurality of SRS resources is to be used for uplink transmission, transmitting, based on the third precoding information, data to the network device via the at least one TRP over the at least one SRS resource.

In some embodiments, the at least one TRP is the first TRP. The terminal device 230 may transmit the data by: transmitting, based on the first precoding information, the data to the network device via the first TRP over the at least one SRS resource.

In some embodiments, the at least one TRP includes the first and second TRPs, the at least one SRS resource includes a first SRS resource for uplink transmission via the first TRP and a second SRS resource for uplink transmission via the second TRP. The terminal device 230 may transmit the at least one SRS by: in response to multi-TRP uplink transmission being enabled for the terminal device, transmitting, based on the first precoding information, at least a first part of the data to the network device via the first TRP over the first SRS resource; and transmitting, based on the second precoding information, at least a second part of the data to the network device via the second TRP over the second SRS resource.

Figure 7:
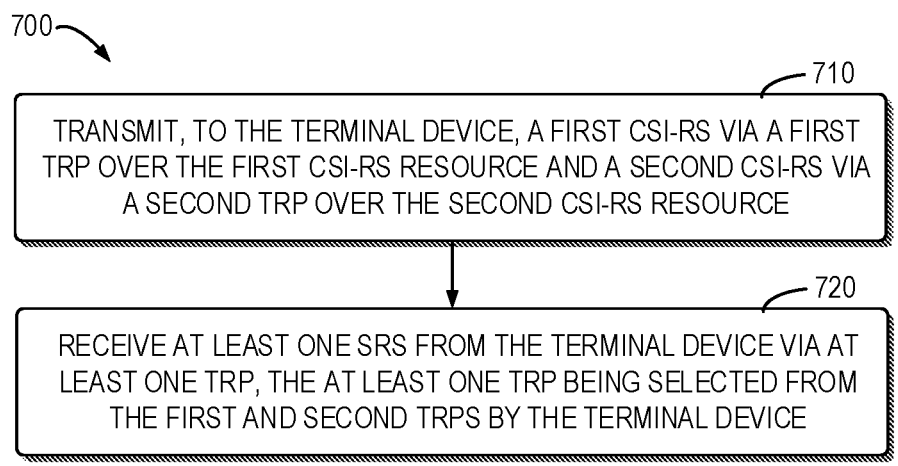
FIG. 7 shows a flowchart of an example method according to some embodiments of the present disclosure.

FIG. 7 shows a flowchart of an example method 700 in accordance with some embodiments of the present disclosure. The method 700 can be implemented at the network device 210 as shown in FIG. 2. It is to be understood that the method 700 may include additional blocks not shown and/or may omit some blocks as shown, and the scope of the present disclosure is not limited in this regard. For the purpose of discussion, the method 700 will be described from the perspective of the network device 210 with reference to FIG. 2.

At block 710, in response to at least one SRS resource set associated with first and second CSI-RS resources being configured to a terminal device, the network device 210 transmits, to the terminal device, a first CSI-RS via a first TRP over the first CSI-RS resource and a second CSI-RS via a second TRP over the second CSI-RS resource.

At block 720, the network device 210 receives at least one SRS from the terminal device via at least one TRP, the at least one TRP being selected from the first and second TRPs by the terminal device.

In some embodiments, the at least one SRS resource set includes a plurality of SRS resources and the at least one TRP is the first TRP. The network device 210 may receive the at least one SRS by: receiving, from the terminal device, the at least one SRS transmitted via the first TRP over the plurality of SRS resources.

In some embodiments, the at least one SRS resource set includes a plurality of SRS resources and the at least one TRP includes the first and second TRPs. The network device 110 may receive the at least one SRS by: in response to multi-TRP uplink transmission being enabled for the terminal device, receiving, from the terminal device, a first SRS transmitted via the first TRP over a first part of the plurality of SRS resources; and receiving, from the terminal device, a second SRS transmitted via the second TRP over a second part of the plurality of SRS resource.

In some embodiments, the network device 210 may receive the first SRS by: receiving, from the terminal device, the first SRS transmitted based on a first SRS configuration. The network device 210 may receive the second SRS by: receiving, from the terminal device, the second SRS transmitted based on a second SRS configuration.

In some embodiments, the first SRS configuration is different from the second SRS configuration.

In some embodiments, the first and second SRS configurations are associated with at least one of the following: different SRS resources; different SRS sequences; and different cycle shift values for SRS sequence generation.

In some embodiments, the at least one SRS resource set includes a plurality of SRS resources. The method 700 further comprises: determining, from the plurality of SRS resources, at least one SRS resource to be used for uplink transmission; indicating the at least one SRS resource to the terminal device; and receiving, from the terminal device, data transmitted via the at least one TRP over the at least one SRS resource.

In some embodiments, the network device 210 may indicate the at least one SRS resource by determining the number of bits for indicating the at least one SRS resource based on at least one of the following: the number of SRS resources included in the plurality of SRS resources, the number of TRPs included in the at least one TRP, and whether multi-TRP uplink transmission is enabled for the terminal device; and indicating, with the determined number of bits, the at least one SRS resource to the terminal device.

In some embodiments, the at least one TRP is the first TRP. The network device 210 may receive the data by receiving, from the terminal device, the data transmitted via the first TRP over the at least one SRS resource.

In some embodiments, the at least one TRP includes the first and second TRPs, the at least one SRS resource includes a first SRS resource for uplink transmission via the first TRP and a second SRS resource for uplink transmission via the second TRP. The network device 210 may receive the data by: in response to multi-TRP uplink transmission being enabled for the terminal device, receiving, from the terminal device, at least a first part of the data transmitted via the first TRP over the first SRS resource; and receiving, from the terminal device, at least a second part of the data transmitted via the second TRP over the second SRS resource.

Figure 8:
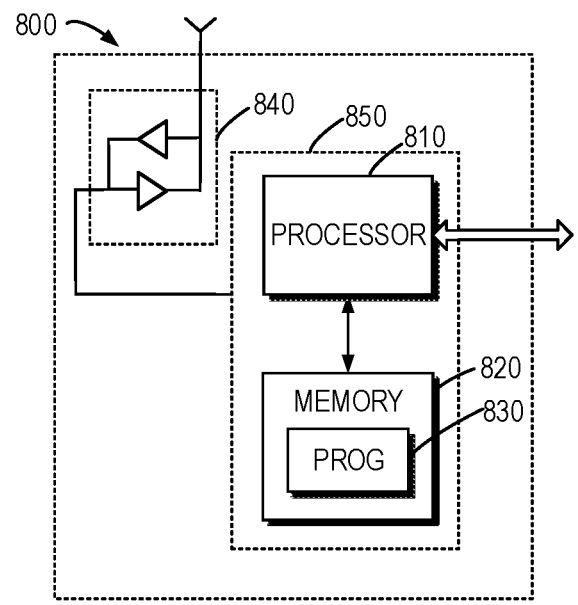
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the network device 210 or the terminal device 230 as shown in FIG. 2. Accordingly, the device 800 can be implemented at or as at least a part of the network device 210 or the terminal device 230.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 2 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 6 and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular 1o embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
receiving, from a network device, configuration information of a first Sounding Reference Signal (SRS) resource set and a second SRS resource set and the first SRS resource set being associated with a first Channel State Information-Reference Signal (CSI-RS) resource and the second SRS resource set being associated with a second CSI-RS resource;
receiving, from the network device, a first CSI-RS transmitted via a first Transmission and Reception Point (TRP) over the first CSI-RS resource and a second CSI-RS transmitted via a second TRP over the second CSI-RS resource,
determining, first precoding information for a first SRS based on the first CSI-RS and second precoding information for a second SRS based on the second CSI-RS;
transmitting, to the network device, the first SRS based on the first precoding information via the first TRP and the second SRS based on the second precoding information via the second TRP; and
transmitting, to the network device, at least one first Physical Uplink Shared Channel (PUSCH) based on the first SRS resource set and at least one second PUSCH based on the second SRS resource set in a case where an indication that the first SRS resource set and the second SRS resource set are to be used for at least one PUSCH is received by the terminal device.

2. The method of claim 1, wherein transmitting the first SRS and the second SRS comprises:
transmitting the first SRS over the first SRS resource set, and
transmitting the second SRS over the second SRS resource set.

3. The method of claim 1, wherein transmitting the first SRS comprises:
determining a first SRS configuration for transmission of the first SRS, and
transmitting the first SRS based on the first SRS configuration; and
transmitting the second SRS comprises:
determining a second SRS configuration for transmission of the second SRS, and
transmitting the second SRS based on the second SRS configuration.

4. The method of claim 3, wherein the first SRS configuration is different from the second SRS configuration.

5. The method of claim 4, wherein the first SRS configuration and the second SRS configuration are associated with at least one of the following:
different SRS resources;
different SRS sequences; and
different cycle shift values for SRS sequence generation.

6. The method of claim 1, further comprising:
transmitting, to the network device, at least one first PUSCH based on the first SRS resource set, in a case where an indication that the first SRS resource set is to be used for at least one PUSCH is received by the terminal device.

7. A terminal device, comprising a processor configured to:
receive, from a network device, configuration information of a first Sounding Reference Signal (SRS) resource set and a second SRS resource set by the network device and the first SRS resource set being associated with a first Channel State Information-Reference Signal (CSI-RS) resource and the second SRS resource set being associated with a second CSI-RS resource;
receive, from the network device, a first CSI-RS over the first CSI-RS resource and a second CSI-RS over the second CSI-RS resource;
determine, first precoding information for a first SRS based on the first CSI-RS and second precoding information for a second SRS based on the second CSI-RS;
transmit, to the network device, the first SRS based on the first precoding information and the second SRS based on the second precoding information; and
transmitting, to the network device, at least one first Physical Uplink Shared Channel (PUSCH) based on the first SRS resource set and at least one second PUSCH based on the second SRS resource set in a case where an indication that the first SRS resource set and the second SRS resource set are to be used for at least one PUSCH is received by the terminal device.

8. A method implemented at a network device, comprising:
transmitting, to a terminal device, configuration information of a first Sounding Reference Signal (SRS) resource set associated with a first Channel State Information-Reference Signal (CSI-RS) resource and a second SRS resource set associated with a second CSI-RS resource;
transmitting, to the terminal device, a first CSI-RS via a first Transmission and Reception Point (TRP) over the first CSI-RS resource and a second CSI-RS via a second TRP over the second CSI-RS resource;
receiving, from the terminal device, a first SRS via the first TRP based on first precoding information and a second SRS via the second TRP based on second precoding information wherein the first precoding information being determined based on the first CSI-RS and the second precoding information being determined based on the second CSI-RS; and
receiving, from the terminal device, at least one first Physical Uplink Shared Channel (PUSCH) based on the first SRS resource set and at least one second PUSCH based on the second SRS resource set in a case where an indication that the first SRS resource set and the second SRS resource set are to be used for at least one PUSCH is received by the terminal device.

9. The method of claim 8, wherein receiving the first SRS and the second SRS comprises:
receiving the first SRS over the first SRS resource set, and
receiving the second SRS over the second SRS resource set.

10. The method of claim 9, wherein
receiving the first SRS comprises:
receiving the first SRS transmitted based on a first SRS configuration; and
receiving the second SRS comprises:
receiving the second SRS transmitted based on a second SRS configuration.

11. The method of claim 10, wherein the first SRS configuration is different from the second SRS configuration.

12. A network device, comprising a processor configured to:
transmit, to a terminal device, configuration information of a first Sounding Reference Signal (SRS) resource set associated with a first Channel State Information-Reference Signal (CSI-RS) resource and a second SRS resource set associated with a second CSI-RS resource;

transmit, to the terminal device, a first CSI-RS over the first CSI-RS resource and a second CSI-RS to over the second CSI-RS resource;

receive, from the terminal device, a first SRS based on first precoding information and a second SRS based on second precoding information, wherein the first precoding information being determined based on the first CSI-RS and the second precoding information being determined based on the second CSI-RS; and receive, from the terminal device, at least one first Physical Uplink Shared Channel (PUSCH) based on the first SRS resource set and at least one second PUSCH based on the second SRS resource set in a case where an indication that the first SRS resource set and the second SRS resource set are to be used for at least one PUSCH is received by the terminal device.

* * * * *